United States Patent [19]

Ouchi et al.

[11] 4,283,346

[45] Aug. 11, 1981

[54] TREATMENT OF AN OIL-CONTAINING CLAY

[75] Inventors: Hiroo Ouchi, Yokohama; Noriyasu Saito, Yokosuka, both of Japan

[73] Assignee: The Nisshin Oil Mills, Ltd., Tokyo, Japan

[21] Appl. No.: 1,575

[22] Filed: Jan. 8, 1979

Related U.S. Application Data

[63] Continuation of Ser. No. 776,043, Mar. 9, 1977, abandoned.

[51] Int. Cl.$^3$ ............................. C11B 3/04; C11B 3/06
[52] U.S. Cl. ...................................... 260/424; 210/671; 260/425
[58] Field of Search ................... 134/19, 25 R, 27–30, 134/40; 210/30 R, 30 A, 32, 40, DIG. 26, 671; 252/412, 413; 260/412.2, 424, 427, 428, 412.5, 419, 425

[56] References Cited

U.S. PATENT DOCUMENTS

| | | | |
|---|---|---|---|
| 1,763,167 | 6/1930 | Lowery | 252/412 |
| 2,117,223 | 5/1938 | Slocum | 252/412 |
| 2,509,509 | 5/1950 | Leaders et al. | 260/428 |
| 2,577,079 | 12/1951 | Gee | 260/428 |
| 2,706,201 | 4/1955 | Chaloner et al. | 260/412.5 |
| 2,812,343 | 11/1957 | Cox et al. | 260/424 |

Primary Examiner—Ivars C. Cintins
Attorney, Agent, or Firm—Sughrue, Mion, Zinn, Macpeak and Seas

[57] ABSTRACT

In the decoloration of an animal and vegetable fat and oil with clay, an oil-containing clay is obtained as by-products. Good recovery of oil is attained by subjecting the oil-containing clay to an alkali treatment under high temperature and high pressure, adding an acid in an amount necessary for neutralization and removing the floating oil. Clay sludges and waste water after the recovery of oil can be easily disposed without causing the environmental contamination.

8 Claims, No Drawings

TREATMENT OF AN OIL-CONTAINING CLAY

This is a continuation of application Ser. No. 776,043, filed Mar. 9, 1977, now abandoned.

BACKGROUND OF THE INVENTION

This invention relates to a method for recovering an oil residue from an oil-containing clay and treating the oil-containing clay without causing the environmental contamination.

In the decoloration of an animal and vegetable oil and fat using clay or mixtures of clay and active carbon as a decoloring agent, coloring matters present in the oil and fat are removed by adsorption. At this time, 10–50% of the oil and fat based on the weight of the decoloring agent are adsorbed or attached and therefore, the clay containing the oil and fat as well as the coloring matters is obtained.

The term of an "oil-containing clay" used hereinafter means a mixture consisting mainly of clay containing an animal and vegetable oil and fat, which is by-produced in the decoloration step of the oil and fat.

Because the oil-containing clay can not be disposed or discarded as it is, there has, hitherto, been effected a treatment method including steps of adding a small amount of alkali and water into the oil-containing clay, boiling it for 2–3 hours, allowing same to stand for 6–24 hours, separating and recovering the resulting oil portion and thereafter, discarding clay sludges or utilizing them for land filling.

With this conventional method, however, the recovery percentage of oil is low so that about 10% of oil are still maintained in the clay sludge after the recovery of oil. Therefore there are disadvantages that the environmental contamination is caused by discarding the clay sludge, the treatment efficiency is lowered due to the prolonged time for separating the oil portion, and the waste water discharged after the recovery of oil contaminates water because it has a high COD of 15,000–30,000 ppm and a high oil content of more than 1,000 ppm.

SUMMARY OF THE INVENTION

An object of this invention is therefore to provide a treatment method for the oil-containing clay, in which the oil portion is recovered with high yield in a shortened treatment time and clay sludges and waste water discharged after the recovery of oil cause no environmental contamination.

In accordance with this invention, there is provided a treatment method for the oil-containing clay which comprises adding to the oil-containing clay water and an alkali in an amount corresponding to at least saponification value relative to the oil content to obtain a slurry, and if desired, subjecting the resulting slurry to a pretreatment at temperatures of about 90°–95° C., then treating the slurry at temperatures of about 110° C. or more under high pressure to strip the oil portion, adding to same an acid in an amount sufficient for neutralization, and separating and recovering the floating oil and fat.

DETAILED DESCRIPTION OF THE INVENTION

We have now found that when the oil-containing clay is treated with an alkali under high temperature and high pressure, the recovery of oil from the oil-containing clay can be effected with good yield.

An alkali which may be used is a caustic alkali and preferably, caustic soda. The amount of alkali added should be in an amount corresponding to at least saponification value relative to the oil content. Since the oil-containing clay is normally acidic, it is preferred that amounts of 1.5 to 2 times the saponification value are used in practice.

The preferred amount of water added is in 2 to 5 times the amount of the oil-containing clay.

Alternatively, the alkali may be used in the form of an aqueous solution which has previously been dissolved in an amount of water to be added.

The oil-containing clay made a slurry by addition of water and alkali is then treated under high temperature and high pressure.

According to the preferred embodiment of this invention, the slurry may conveniently be subject to a pretreatment at temperatures of about 90° to 95° C. prior to the treatment at high temperature and high pressure. The treatment period of time is more than 30 minutes, preferably 1 to 1.5 hours. By this pretreatment, the slurry is placed in such a condition that the oil portion is apt to be stripped from the clay and therefore, the subsequent procedures can be conveniently effected.

Next, the treatment at high temperature and high pressure may be conducted at temperatures of about 110° C. or more, preferably 140°–150° C. under pressures of more than about 5 kg/cm$^2$, preferably 6 to 7 kg/cm$^2$. Although the upper limit of temperature is not particularly critical, preferably it is 200° C. When exceeding 200° C., the oil portion of inferior quality is recovered.

For the purpose of the above treatment, apparatus such as an autoclave and a tubing may be used. The tubing is, for example, a metal pipe of 5–40 cm in inner diameter and 5–40 m in length. The oil-containing clay slurry is forced into the tubing with a high pressure steam by means of a plunger pump, and the stripping of oil is effected continuously while the slurry passes through the tubing. The use of tubing is preferred from the view-points that a continuous operation is possible with a high treatment efficiency, the cost of equipments is reduced, and the operation and the maintenance of security are easy.

By using such means, the treatment can be accomplished in a very short time and the stripping of oil is complete usually in periods of from 20 minutes to 2 hours.

Next, an acid is added and then, an oil portion is separated and floated. The acid which may be used is an inorganic acid and preferably, sulfuric acid. The floated oil phase usually contains a large quantity of fatty acids and after washing, can be used as fatty acid materials. The yield of recovery of oil is very high, i.e. more than 95%.

Then, the aqueous lower phase is separated into clay sludges and waste water by separating means such as a filter press. The clay sludge which includes an oil residue of less than 0.5% and water of about 50% incurs no danger of environmental contamination, so that it can be discarded as industrial wastes. Also, the waste water has a COD value of less than 3,000 ppm, an oil residue of less than 100 ppm and pH of 6–7. Since these values are remarkably low as compared with those obtained by the conventional methods, a load of post-treatment is reduced.

This waste water, after subjecting to the usual water treatment such as an activated sludge process, may be discharged, or without subjecting to such a water treatment may be reused for recycling as a part of water which is used in the first step of preparing a slurry from an oil-containing clay. Thus the recycling has advantages that the consumption of water can be saved and a load of the waste water treatment or a COD load can be reduced.

As mentioned above, this invention is very useful for industries in that the oil portion of an oil-containing clay can be nearly all separated and recovered in a short time and that clay sludges and waste water after the separation of oil can be placed in the condition of causing no trouble from the standpoint of the prevention of environmental contamination.

This invention will be illustrated by the following non-limitative example.

EXAMPLE

To 500 kg of an oil-containing clay (oil content, 25%) by-produced in the decoloration step of soybean oil were 1,500 kg of water and 27.3 kg of sodium hydroxide (corresponding to 150% of the saponification value) added to form a slurry.

The resulting slurry was charged into a pretreatment container and stirred at temperatures of 90°–95° C. for 30 minutes. After the pretreatment, the slurry was forced with a high pressure steam into a tubing (inner diameter 20 cm, length 18 m) consisting of a metal pipe by means of a plunger pump and thus, the oil portion was stripped. At this time the conditions were about 150° C. in temperature, about 5 kg/cm$^2$ in pressure of steam and about 25 kg/min. in a flow rate of the slurry. The treatment was continued for about 80 minutes.

The saponified product discharged from the tubing was introduced into a decomposition tank, where 18.4 kg of concentrated sulfuric acid (corresponding to the neutralization equivalent) were added at temperatures of 85°–95° C. and then, fatty acid was separated and floated. At this time the contents of the tank were adjusted to pH of 6.8–7.2 till the completion of decomposition.

The floated oil phase was charged through an overflow into a recovery tank, where water was removed. The oil thus obtained gave a yield of 120 kg (recovery ratio, 96%), and could be used for fatty acid materials.

The aqueous lower phase was filtered by a filter press to separate clay sludges from waste water. The clay sludge was obtained in the form of cake containing an oil residue of less than 1% and water of about 50%, and could be discarded as industrial wastes.

On the other hand, the waste water had a COD value of about 1,000 ppm, an oil residue of less than 50 ppm and pH of 6.5, and therefore a load of water treatment was remarkably reduced.

COMPARATIVE EXAMPLE

To 500 kg of the same oil-containing clay as in Example were 1,500 kg of water and 5 kg of sodium hydroxide (corresponding to 27% of the saponification equivalent) added to form a slurry.

The resulting slurry was charged into a boiling tank, boiled at 90°–95° C. for 3 hours and allowed to stand for 24 hours.

The floated oil was very low in yield, i.e. 60 kg (recovery ratio, 48%).

The aqueous lower phase was filtered by a filter press to separate a clay cake from waste water. The clay cake contained as much oil residue as about 10% and therefore, could not be discarded as it was. Also, the waste water has a COD of 30,000 ppm and an oil content of 1,000 ppm so that it would contaminate water when discharged.

What we claim is:

1. A process for the recovery of oil from an oil-containing clay which has been by-produced in the decoloration of an animal and vegetable fat and oil with a decoloring agent consisting mainly of said clay, which comprises adding to said oil-containing clay, water and an alkali in an amount corresponding to at least the saponification value relative to the oil content thereof to obtain a slurry, treating the slurry at high temperature of about 110° C. or more under high pressures of more than about 5 kg/cm$^2$ to strip the oil portion, then adding an acid in an amount sufficient for neutralization to cause formation and surfacing of the oil portion primarily as fatty acids, separating and recovering the floating fatty acids and oil, and separating the clay-containing aqueous lower phase into clay sludges and waste water.

2. A process according to claim 1 wherein said slurry is subjected to a heating pretreatment at about 90°–95° C. prior to said high temperature and high pressure treatment.

3. A process according to claim 1 wherein said high temperature and high pressure treatment is effected by forcing the slurry into a tubing with a high pressure steam to strip the oil portion.

4. A process according to claim 1 wherein said slurry is subjected to a heating pretreatment at about 90°–95° C. and then is forced into a tubing with a high pressure steam to effect said high temperature and high pressure treatment to strip the oil portion.

5. A process according to claim 1 wherein said high temperature treatment is conducted at 140°–150° C.

6. A process according to claim 5 wherein said high pressure treatment is conducted at 6–7 kg/cm$^2$.

7. A process according to claim 1 wherein said alkali is added in an amount of from 1.5 to 2 times said saponification value.

8. A process for the recovery of oil from an oil-containing clay which has been by-produced in the decoloration of an animal and vegetable fat and oil with a decoloring agent consisting mainly of said clay, which comprises adding to said oil-containing clay, water and an alkali in an amount corresponding to at least the saponification value relative to the oil content thereof to obtain a slurry, treating the slurry at high temperature of about 110° C. or more under high pressures of more than about 5 kg/cm$^2$ to saponify the oil portion, then adding an acid in an amount sufficient for neutralization to cause formation and surfacing of the oil portion primarily as fatty acids, separating and recovering the floating fatty acids and oil, and separating the clay-containing aqueous lower phase into clay sludges and waste water.

* * * * *